US011509264B2

(12) United States Patent
Hohulin

(10) Patent No.: US 11,509,264 B2
(45) Date of Patent: Nov. 22, 2022

(54) FULL SPECTRUM ELECTRO-MAGNETIC ENERGY SYSTEM

(71) Applicants: SCOTT HOHULIN FAMILY 2014 IRREVOCABLE TRUST, Wildomar, CA (US); Scott Hohulin, Wildomar, CA (US)

(72) Inventor: Scott Conrad Hohulin, Wildomar, CA (US)

(73) Assignee: SOLAR CUBED HOLDINGS LLC, Las Vegas, NV (US)

( * ) Notice: Subject to any disclaimer, the term of this patent is extended or adjusted under 35 U.S.C. 154(b) by 0 days.

(21) Appl. No.: 15/308,088

(22) PCT Filed: May 22, 2015

(86) PCT No.: PCT/US2015/032148
§ 371 (c)(1),
(2) Date: Oct. 31, 2016

(87) PCT Pub. No.: WO2015/179745
PCT Pub. Date: Nov. 26, 2015

(65) Prior Publication Data
US 2017/0077867 A1    Mar. 16, 2017

Related U.S. Application Data

(60) Provisional application No. 62/024,305, filed on Jul. 14, 2014, provisional application No. 62/002,122, filed on May 22, 2014.

(51) Int. Cl.
*H02S 99/00* (2014.01)

(52) U.S. Cl.
CPC ............... *H02S 99/00* (2013.01); *Y02E 10/52* (2013.01)

(58) Field of Classification Search
CPC .. H01L 31/0543; H01L 31/0203; H02S 99/00
(Continued)

(56) References Cited

U.S. PATENT DOCUMENTS 5,009,243 A * 4/1991 Barker ............ H01L 31/022433
136/244
5,590,031 A 12/1996 Mead, Jr. et al.
(Continued)

FOREIGN PATENT DOCUMENTS

| GB | 2540309 | 1/2017 |
|---|---|---|
| WO | 2013093909 | 6/2013 |
| WO | 2015179745 | 11/2015 |

OTHER PUBLICATIONS

Letter regarding Examination Report from Keltie LLP dated Dec. 16, 2016, 5 pages; Examination Report from Intellectual Property in the UK dated Nov. 30, 2016, 5 pages; Letter from intellectual Property Office in UK dated Dec. 12, 2016 re: Patents Act 1977: Patents Rules 2007 PCT.
(Continued)

*Primary Examiner* — Bethany L Martin
*Assistant Examiner* — Kourtney R S Carlson
(74) *Attorney, Agent, or Firm* — Christopher L. Benner

(57) ABSTRACT

Electro-magnetic (EM) energy collected in three dimensions, in layers allows for multiple planes to function operatively with optimized band gap structures whereby integrated variant and overlapping three-dimensional electro-magnetic films permit systems to collect energy across the entire electro-magnetic spectrum, and present systems utilizing both direct and indirect light to be leveraged. The EM-CS captures and contains more energy from EMR than conventional systems addressing global energy needs.

16 Claims, 18 Drawing Sheets

(58) Field of Classification Search
USPC .................................................. 136/242–265
See application file for complete search history.

(56) References Cited

U.S. PATENT DOCUMENTS

| | | | |
|---|---|---|---|
| 6,425,391 | B1 | 7/2002 | Davoren et al. |
| 8,471,142 | B1 | 6/2013 | Yu |
| 2003/0213514 | A1 | 11/2003 | Ortabasi |
| 2009/0211620 | A1* | 8/2009 | Dibachi ............... D03D 1/0076 |
| | | | 136/243 |
| 2010/0263709 | A1 | 10/2010 | Norman et al. |
| 2011/0017269 | A1 | 1/2011 | Fangman et al. |
| 2011/0220195 | A1 | 9/2011 | Moronaga et al. |
| 2012/0185635 | A1 | 7/2012 | Eastman et al. |
| 2012/0186635 | A1 | 7/2012 | Eastman et al. |
| 2013/0069191 | A1 | 3/2013 | Or-Bach et al. |
| 2013/0146117 | A1 | 6/2013 | Brady |
| 2013/0146119 | A1* | 6/2013 | Jin ................... H01L 31/035272 |
| | | | 136/246 |
| 2013/0192663 | A1 | 8/2013 | Fonash et al. |
| 2014/0069486 | A1* | 3/2014 | Snidow ................... H02S 40/22 |
| | | | 136/251 |
| 2014/0283895 | A1* | 9/2014 | Morgan ............. H01L 31/0525 |
| | | | 136/246 |

OTHER PUBLICATIONS

Edward Mausolf, Ph.D, UNLV, Independent Report on the Characteristics of the Hohulin Solar Cell, Jun. 12, 2015; 58 pages.

Wenjie Wan, et al., Time-Reversed Lasing and Interferometric Control of Absorption, www.sciencemag.org, Science, vol. 331, Feb. 18, 2011, pp. 889-892.

Henry Fountain, A Dazzling Show Inside a Laser, but a Vacuum of Light Outside, dated Feb. 21, 2011, The New York Times, Mar. 24, 2018, pp. 1-3.

McConnell, Robert D., et al., Multijunctian Photovoltaic Technologies for high Performance Concentrators, NREL/PR-520-39866, Presented at the 2006 IEEE 4th World Conference on Photovoltaic Energy Conversion (WCPEC-4) held May 7-12, 2006 in Waikoloa, HI.

AU Examination Report No. 1, issued by Australian Government, IP Australia, dated Feb. 24, 2017.

* cited by examiner

Perspective view

End view

Top view

Perspective view

End view

Top view

Perspective view

End view

Section A-A $$\begin{bmatrix} x \\ y \\ z \end{bmatrix} = R \begin{bmatrix} X \\ Y \\ Z \end{bmatrix} + t$$

$x' = x/z$ $y' = y/z$ $x'' = x' \dfrac{1+k_1 r^2 + k_2 r^4 + k_3 r^6}{1+k_4 r^2 + k_5 r^4 + k_6 r^6} + 2p_1 x'y' + p_2(r^2 + 2x'^2)$ $y'' = y' \dfrac{1+k_1 r^2 + k_2 r^4 + k_3 r^6}{1+k_4 r^2 + k_5 r^4 + k_6 r^6} + p_1(r^2 + 2y'^2) + 2p_2 x'y'$ where $r^2 = x'^2 + y'^2$ $u = f_x * x'' + c_x$
$v = f_y * y'' + c_y$

FULL SPECTRUM ELECTRO-MAGNETIC ENERGY SYSTEM

CROSS-REFERENCE TO RELATED APPLICATIONS

This application claims priority to, and the benefit of, U.S. Provisional Patent Application Ser. No. 62/002,122, filed May 22, 2014, and U.S. Provisional Patent Application Ser. No. 62/024,305, filed Jul. 14, 2014, the contents of each of which are incorporated by reference.

FIELD OF THE INVENTION

The present inventions relate to methods and devices for capturing energy from electromagnetic radiation and providing that energy for consumption.

BACKGROUND

Human suffering is a consequence of the predominant but antiquated approach to energy. When people want to drive cars, read at night, or power factories, the dominant theme in supplying energy for that demand is to take some form of reduced carbon out of the Earth and burn it. Since hydrocarbons like oil and coal are not evenly distributed, this approach causes geopolitical instability and violence. Since hydrocarbons are in limited supply, those tensions will be aggravated if alternatives are not found. Even if those geopolitical tensions could be resolved, that basic energy supply paradigm is premised on a one-way stoichiometry in which hydrocarbons are burned to produce carbon dioxide. According to reports from the U.S. Environmental Protection Agency, more than 9 trillion metric tons of carbon are released into the atmosphere each year.

Alternative energy such as solar might help if those sources were able to meet demand. While revenue in the photovoltaic (PV) solar power industry approaches $100 billion annually, PV technology requires huge capital investment that pays off slowly at best. Existing PV cells are deployed as flat panels of material that—at best—produce about 0.200 kW per square meter. On a sunny day, a solar cell the size of a card table could keep six light bulbs lit up, for as long as the sun is shining. For some background on PV cells, see U.S. Pat. No. 8,093,492 to Hering and U.S. Pat. No. 6,689,949 to Ortabasi.

SUMMARY

The invention provides a cell that captures energy from electromagnetic radiation (EMR) and can provide that energy as electricity. The cell captures energy from a broader spectrum of EMR than conventional systems, namely the EV range which extends from ultraviolet to beyond infrared. The cell includes a composition of material that interacts with the EMR across three dimensions of space, exploiting the insight that EMR exerts energy across three independent dimensions—a first dimension defined by a direction of change of a magnetic field B, a second dimension of changing electric field E, and a third dimension being the direction of a propagation of the EMR. By using inward reflectors, the cell captures the EMR internally. By using a 3D medium, the cell maximizes its potential interactions with, and potential for capturing energy from, the EMR. The cell includes a composition of materials characterized by multiple bandgaps. Internal EMR from across a broad electromagnetic spectrum energizes electrons of those materials from the valence bands to the conduction bands, which can be harvested as electric current using the included electrodes.

By including a curved upper surface geometry with absorptive surface and prismatic focusing, a cell captures EMR energy for a great duration of each day even, in fact, when it is not strictly speaking daylight, the cell captures all forms of light, indirect, reflected, diffused, refracted and prismatic. By the described features and phenomena, cells of the invention maximize the EMR spectrum from which energy is captured, and the efficiency of capture of that energy, and the duration of capture per day. For at least those reasons, cells of the invention exhibit very high efficiency and may in fact provide at least about 2.9 kWh per $m^3$ of power or more.

Due to the high efficiency and power production provided by cells of the invention, people's demand for energy may be met without producing stoichiometric amounts of carbon dioxide and without exacerbating geopolitical tensions surrounding unequal distribution of hydrocarbon fuels. Thus systems and methods of the invention provide tools for meeting global energy demand without heaping on the human suffering. Using systems and methods of the invention, people may read at night, travel, operate their business, and continue to conduct their lives in a manner that is enjoyable and sustainable.

It is respectfully submitted that modular technology to address PV solar power issues has been constrained to date by a two-dimensional (Euclidean) approach, which has precluded leveraging of the entire electro-magnetic spectrum of available energy. In short, using x and y axes to define limits and boundaries of PV solar collection of energy is inherently limiting.

Accordingly, it is an objective of the present inventions to provide methodologies, systems and processes leveraging dense packing (ribbon technology) facilitating great Kw/hr and per meter squared maximum energy harvesting.

Briefly stated, electro-magnetic (EM) energy collected in three dimensions, in layers allows for multiple planes to function operatively with optimized bandgap structures whereby integrated variant and overlapping three-dimensional electro-magnetic films permit systems to collect energy across the entire electro-magnetic spectrum, and present systems utilizing both direct and indirect light to be leveraged.

Aspects of the invention provide an electromagnetic energy capture cell that includes a body of material with an upper surface layer and a lower surface layer. The upper surface layer receives electromagnetic radiation (EMR) into the material, the upper and lower surface layers reflect internal (EMR) back into the material, and the material substantially spans three dimensions of space between the upper surface and the lower surface so that the internal EMR interacts with the material in the three dimensions. A composition of the material defines a plurality of bandgaps such that wavelengths of the internal EMR outside of the visible spectrum excite electrons from a valence band to a conduction band.

The cell includes at least one electrode in contact with the material. In a preferred embodiment, the lower surface layer defines a parabolic curve having a focus within the material. The upper surface layer may be curved such that, for example, when the cell sits outdoors on a cloudless day, direct sunlight defines a normal to the curved surface from sunup to sundown. The material may include multiple films comprising a plurality of semiconductors. Preferably, the films define a non-planar geometry. The films may be formed by a process using argon gas such that the films resist delamination. Artisans understand semantics involved in thick/thin terminology are historical artifacts as opposed to technical distinctions.

The cell may include further a first electrode and a second electrode in contact with material and defining a first electrical contact and a second electrical contact accessible from an exterior of the cell. Exposure of the upper surface to EMR comprising infrared wavelengths produces a voltage across the first electrical contact and the second electrical contact.

According to embodiments, the cell converts a broad spectrum of EMR into electricity, the EMR including forms of ultraviolet through and beyond infrared. The cell may be operable to use the UV, visible, and invisible EMR to produce power. Cells of the invention cover a spectrum of 200-5000 EV. It may be found that exposure of the upper surface to the EMR produces at least 2 kW per m$^3$.

In certain embodiments, a cell includes an angled silvered-apical prism to absorb indirect EM radiation energy. The cell may include multiple EM argon films, which may be transparent, stable, and able to absorb 200 nm to 5000 nm. Preferably an angled silvered-apical prism absorbs indirect EM radiation energy. The cell may absorb the total EMR spectrum with less than 10% of the EMR refracted. Prismatic focusing may increase surface area by two-fold.

The cell may include assemblies comprising one or more internal mirrored parabolic reflectors. The cell may include double parabolic reflecting bases (e.g., to encourage internal reflection and multiple passes of photons of EMR through the material). The cell may also include an internal lining that breaks up the EMR and increases absorption by acting as a semi-permeable membrane allowing radiation in but inhibiting its exit. In some embodiments any given photon of internal EMR interacts with electrons at least 7 times. In certain embodiments, photons of internal EMR interact with electrons on average more than 30 times. The cell may include comprising a parabolic mirror surface at the bottom surface that forces EMR back through the material such that photons of EMR, on average, pass through the material at least 7 times, and at least some of the photons of EMR pass through the material at least 37 times.

By the foregoing features, chemistry, and structure, cells of the invention harvest energy from a complete spectrum of EMR from UV to beyond IR.

DETAILED DESCRIPTION

Figure 1:
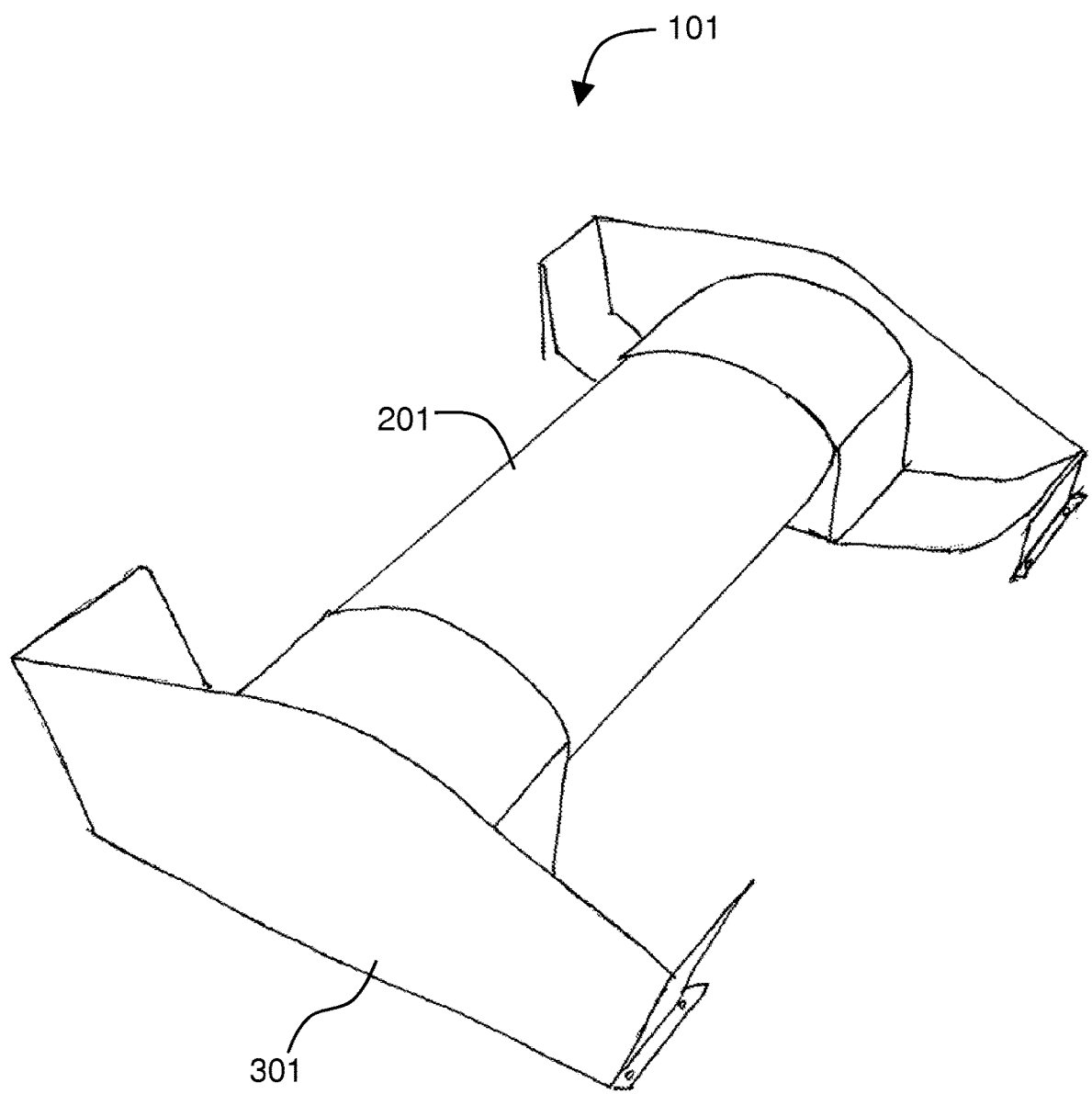
FIG. 1 shows a cell 101 of the invention.

Shown herein is an electromagnetic energy capture cell that includes a body of material with an upper surface and a lower surface. The material may include a glass or other such material with a chemistry and internal shape that exhibits the recited properties. At least the lower surface can provide parabolic focusing as described. The cell preferably has an upper surface which receives electromagnetic radiation (EMR) into the material, the upper and lower surfaces reflect internal (EMR) back into the material, and the material substantially spans three dimensions of space between the upper surface and the lower surface so that the internal EMR interacts with the material in the three dimensions. A composition of the material e.g., in the form of films according to the inventive process (e.g., made via an argon purging process) defines a plurality of bandgaps such that wavelengths of the internal EMR outside of the visible spectrum excite electrons from a valance band to a conduction band. The cell has an internal structure or geometry with overlapping formation, i.e., a ribbon technology or placement energy density that generates more power than conventional PV arrays as shown by the data herein.

The present invention has configured an Electro-Magnetic Capture System which leverages the entire spectrum of such radiated energy to generate power.

The depicted electromagnetic capture system (EM-CS) covers a broader spectrum of 200-5000 nm whereas today's standard PV convers a lesser range of 800-1100 nm. EM-CS utilizes a more dynamic Argon film as opposed to today's standard thin film.

EM Capturing system (EM-CS) is a new technology which captures and converts a broad spectrum of EMR including forms of ultraviolet through and beyond infrared (C) forms of light in the realm of heat capturing.

The technologies' ability to capture a broader daily range of electro-magnetic radiation as such is not the same as "solar." This increased range coupled with increased system efficiencies delivers greater panel capacity for longer periods of time which results in a lower cost per Watt and greater total output.

The increased panels capacity requires significantly less surface area allowing panels to be installed even where space is limited and or expensive.

"Containing" or "Capturing" (used coextensively for this application) technology generates significant cost savings over current residential/commercial/utility grade installations due to its smaller construction footprint and reduced panel count which requires significantly less real estate, installation labor, and ancillary equipment.

EM-CS technology combined with battery storage can function as the first legitimate 'base load' renewable energy solution.

Appropriate for both grid-tied and off-grid system, the instant systems provide for de-limited usage of EM whole spectrum energy.

According to embodiments, "panels" of the instant inventions are designed to contain/capture and convert a larger range of Radiation of up to 2.9 kW/m3 unlike all other panels on the market. Since, according to the present inventions, panels use the UV, visible and invisible light spectrums.

According to embodiments, there are disclosed multiple EM "Argon films" (transparent, stable, and able to absorb 200 ev to 5000 ev). Likewise, proprietary glass formulations are designed to absorb to total EM radiation spectrum (with minimal −6-8% refracted light, of any type), the addition of angled silvered-apical prisms further increases the ability to absorb indirect EM radiation energy.

According to embodiments, double Parabolic reflecting bases directs and captures sunlight so the system's efficiency is maximized.

The technology allows for up to 800 percent more EM radiation, giving more total kW/day absorbed, depending upon Solstice and zone.

According to embodiments, the internal lining breaks up EM radiation, increasing absorption acting as a semi-permeable membrane allowing radiation in but inhibiting its exit.

The new technology increases total radiation up to 66% more than film alone. That is why this is an EM "system" not just another solar panel, as the prior art discloses.

The ability to absorb: direct, indirect, reflect, prismatic and even diffused energy, is likewise featured.

Internal design increases electron passage at least about 7-37 times, it is respectfully submitted.

In contra-distinction to conventional systems where EM panels only use part of the EM spectrum. (Current panels use only the visible spectrum at up to 20% of 0.6 kW/m2).

Existing solar panels only use 800 to 1100 wavelength utilize EMR between 800 nm to 1100 nm, whereas the instant teaching use Broad Spectrum Technology which uses a much larger spectrum of EMR, between 200 nm to 5000 nm.

Existing solar panels only use 800 to 1100 wavelength, whereas the instant teachings use Broad Spectrum Technology which uses a much larger 200 to 5000 wavelength.

Current panels "bounce" sunlight, whereas the new EM panels "capture" the sun's energy, and/or "contain" much larger aliquots of the same.

The radiation rotational design increases radiation exposure up to nearly 70% greater than traditional models This design uses the angle of sunlight, the rotation of the earth, the relationship between direct line increased time and greater absorption to decrease reflected/refracted light and increase the amount of light radiation that enters the capture cell (Snell's Law).

The design of the claimed invention utilizes a curved upper surface, with the curve of the body designed to allow tracking of the sunlight without external tracking mechanisms. The curved upper surface design is also calibrated to focus the sunlight inside the invention allowing maximization of internal reflection of sunlight to allow increased efficiency by increased opportunity for absorption by the films within the invention.

In addition, the glass composition enables it to absorb indirect light.

Additional useful background may be found in Takamoto, 2009, Status of multijunction solar cells and future development, CS MANTECH CONFERENCE, May 18th-21st, Tampa, Fla., USA (4 pages); U.S. Pat. No. 8,093,492 to Hering; U.S. Pat. No. 6,335,480 to Bach; and U.S. Pat. No. 6,689,949 to Ortabasi, each of which is expressly incorporated by reference, as if fully set forth herein, for all purposes.

The technology disclosed herein is directed toward systems and methods for generating energy from sources such as the sun. Embodiments of the disclosed technology are configured so as to be able to capture a broad spectrum of electromagnetic energy and efficiently convert that energy into electricity for a variety of uses. A variety of features can be included to enable efficient capture of electromagnetic energy into increase the efficiency of the solar power generation system. For example, unique shapes and compositions of glass can be used to improve the entry and capture of light in the system, a parabolic or other like reflector can be used to capture energy, such as so solar energy from the sun (or other source of electromagnetic energy) at various angles, and multiple layers of photovoltaic materials at a variety of different band gaps can be combined to capture a broad spectrum of electromagnetic energy within and beyond the visible light spectrum.

An early prototype of the system includes a glass or other transparent enclosure, an energy conversion stack created using one or more solar conversion materials (i.e., photovoltaic materials) having different band gaps (bandgap materials), and a reflector that can be configured to redirect sunlight (or other electromagnetic energy from the sun) to the glass enclosure that might not otherwise impinge on the enclosure, so that the reflected light can be captured by the glass enclosure and directed toward the photovoltaic materials. These and other features and aspects of the disclosed technology can be utilized and combined in various combinations to create an efficient energy generating system. Various aspects of these features are described in this document by way of example. In various embodiments, the glass used to encase the photovoltaic materials can be formulated to increase or maximize the total amount of the electromagnetic radiation spectrum that reaches, and can be captured by, the photovoltaic materials.

The glass is tempered to improve its resistance to breakage, and is desirable for its ability of the glass to allow EMR of specified wavelengths to pass through the glass at the same wavelength. For example, in various embodiments, tempered phosphate MgF and sapphire glass can be provided with a transmission spectrum delivering approximately 80 to 90% transmission across a spectrum of approximately 400 to 2750 nm. In some embodiments, the glass can achieve a high percentage of transmission over a spectrum of approximately 200 to 5000 nm. The glass can be doped with a phosphorus chemical (e.g., 20% or less, although other doping percentages can be used) to alter the absorption of electromagnetic energy as well as the refractive index of the glass. The doping is done with a view to increasing the effective angle of acceptance of the glass such that more EMR is accepted into the glass and less is reflected off of the surface of the glass as compared to non-doped glasses.

Additionally, the glass encasement is managed including antireflective (AR) coating on the outer surface of the glass and an oxide coating on the inner surface of the glass, inter alia. The antireflective coating can be added to reduce the amount of reflections off of the outer surface as compared to an uncoated glass. The oxide coating on the inner surface can be provided to perform various functions. For example, the oxide coating can be provided to prismatically divide the light into its constituent spectral components. This allows incoming light to be separated into spectral components and the spectral components to be directed at different directions from the inner surface of the glass.

The oxide coating can also act as a semi-permeable membrane, allowing radiation in but inhibiting its exit. This can facilitate the reuse of photons that are not absorbed and converted on their first pass through the materials. With the appropriate doping and other characteristics as described, embodiments can be implemented that achieve the delivery to the bandgap materials of 58.86% of direct light impinging on the glass, and delivery to the bandgap materials of up to 30% of indirect light impinging on the glass. This can be achieved because light impinging on the glass at a shallow angle can be captured rather than reflected, and then can be refracted toward the photovoltaic bandgap materials located within the central region of the glass encasement.

According to instant teachings light impinging on the glass at a shallow angle can be captured rather than reflected A simple example of this is illustrated in FIG. 2 in which incoming light rays at shallow angles are accepted by and refracted toward the stack of photovoltaic energy conversion materials. The shape of the glass housing is important to increasing the efficiency of the system and the range of the electromagnetic spectrum that can be captured by the system. The shape is not limited to that shown in the figures. Various shapes of glass enclosure can be used, however, in some embodiments, a rounded shape is used to present a more direct angle to the source of the electromagnetic energy (e.g., the sun, a lamp, or other energy source) and to facilitate refraction of the light toward the photovoltaic materials.

In one aspect, the invention provides an improved high efficiency electromagnetic energy capturing system (EM-CS). The EM-CS includes a cell 101.

FIG. 1 shows a cell 101 of the invention. Cell 101 includes a core member 201 and one or more end members 301.

Figure 2A:
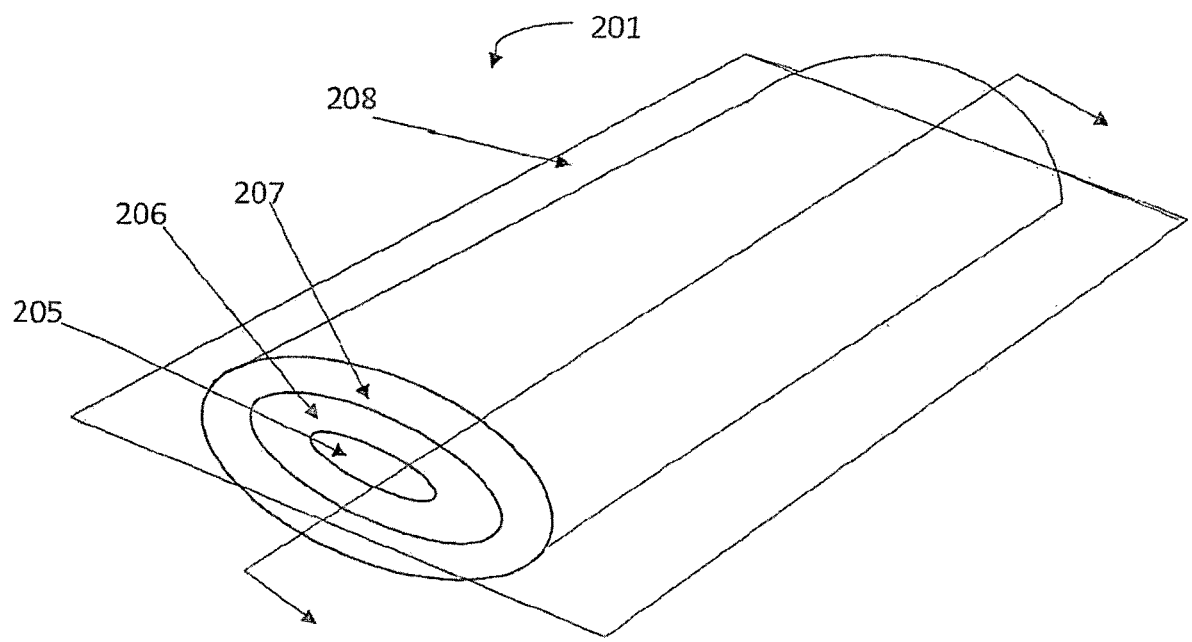
FIGS. 2A-2C show a core member 201 of the cell 101.
Figure 2B:
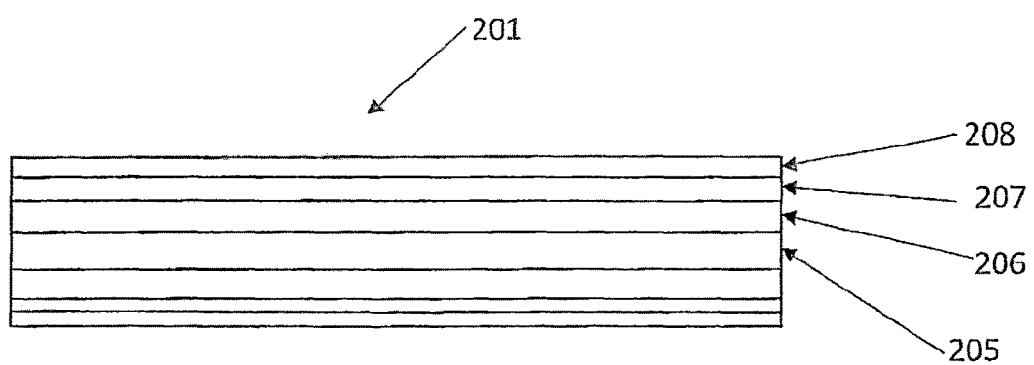
Figure 2C:
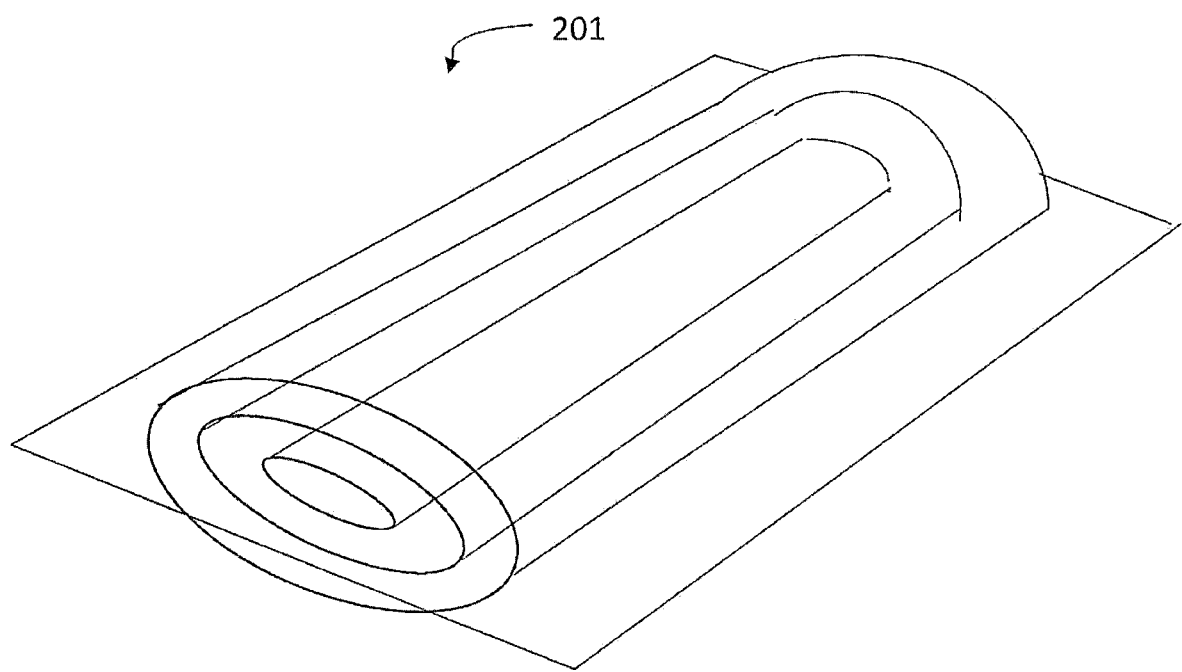

FIGS. 2A-2C show a core member 201 of the cell 101. FIG. 2A gives a perspective view of core member 201. FIG. 2B gives a cut-away profile view of member 201. FIG. 2C shows a network of electrodes in core member 201. Core member 101 includes, in combination, at least a material body with an upper and lower surface layer, whereby the upper surface layer receives electromagnetic radiation (EMR) into the material and the upper and lower surface layers reflect internal EMR back into the material. The surface layer preferably includes doped glass, e.g., with MgF2 or other suitable metal halide or such material ("proprietary glass"). The body spans three dimensions of space between the upper surface layers and lower surface layers whereby the internal EMR interacts with the material in these dimensions. The body captures EMR traveling therein by means of the dense packed ribbon technology defined by a plurality bandgaps whereby wavelength of the internal EMR excite electrons from a valence band to a conduction band. The dense packed ribbon technology includes an innermost film 205, a second film 206, a third film 207, and an outermost film 208. In a preferred embodiment, between at least about 3 and 7 films are included. In one embodiment each film includes one separately selected from GaAs, Ge, Si and GaInP2. Each film may separately include materials listed in Table 1. In other embodiments materials such as GaS, GIP, GIA, InGa, CdTe, CIGS, CdTe/CdS, CuInSe2, GIN, ZMT, and/or CdS, may be used. FIG. 2C illustrates electrodes in contact with the films of the body. An upper surface herein dubbed "proprietary glass" of the material body may be provided by a glass that is doped with a metal halide, preferably MgF2, to maximize retention of EM radiation in the cell 101. The doped upper surface may be outermost film 208 or is preferably a covering layer on top of the material body.

Figure 3:
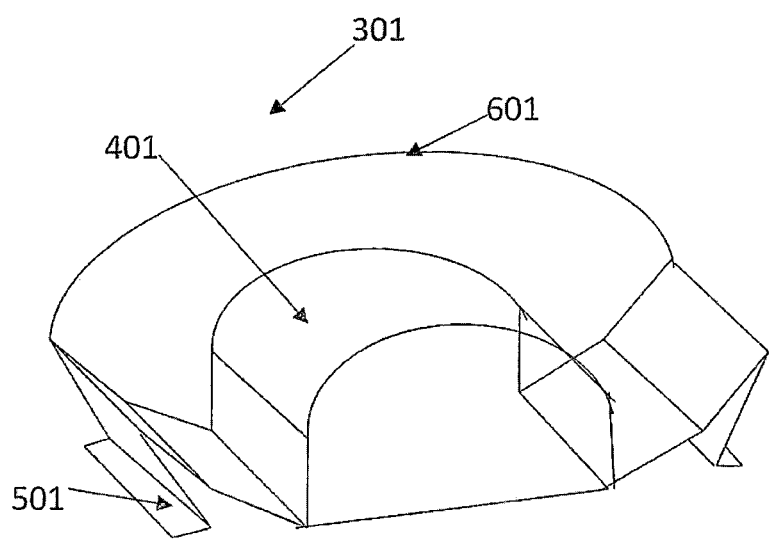
FIG. 3 shows an end member 301 of the cell 101.
Figure 4A:
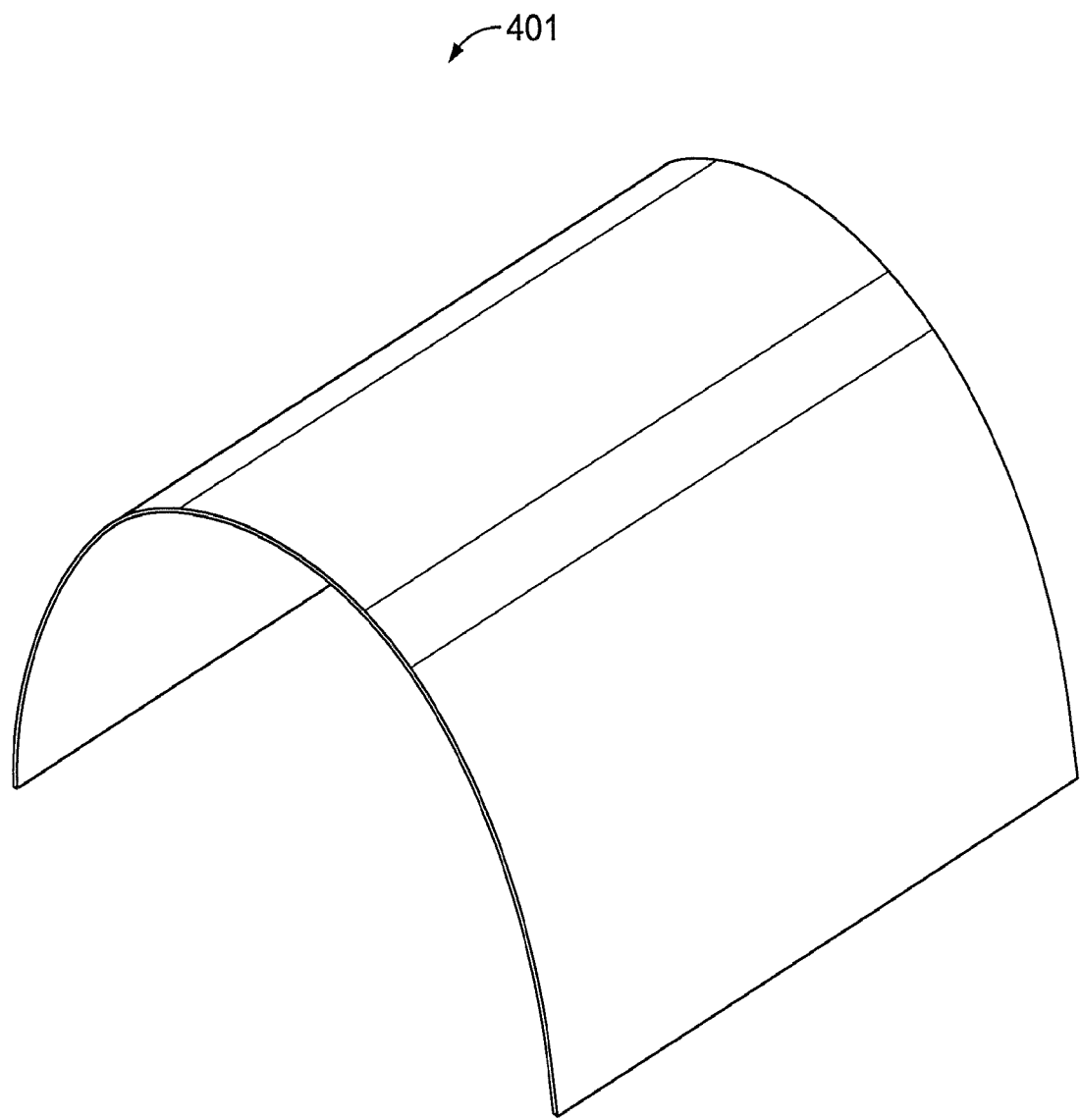
FIGS. 4A-4C shows views of an exemplary outer assembly hardware section 401 according to the teachings of the present invention.
Figure 4B:
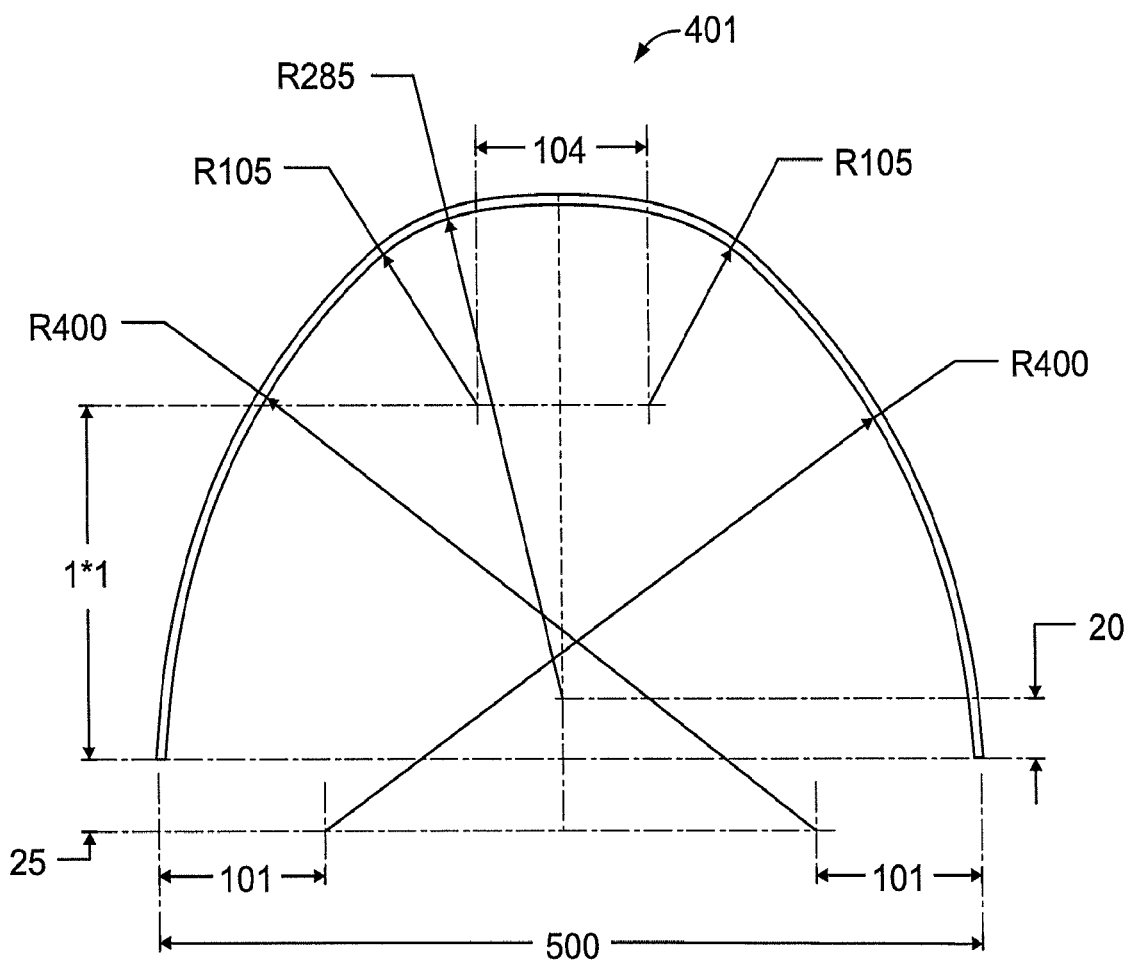
Figure 4C:
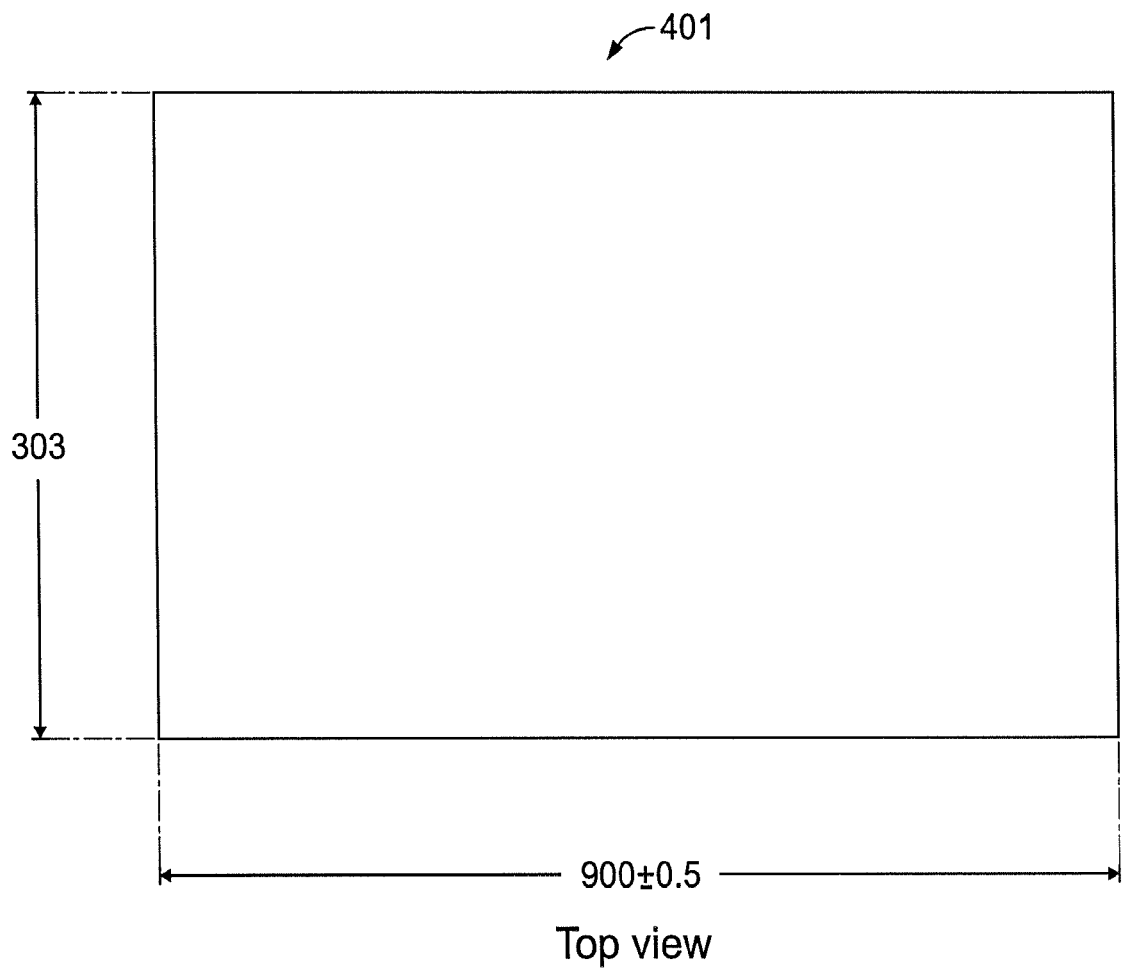
Figure 5A:
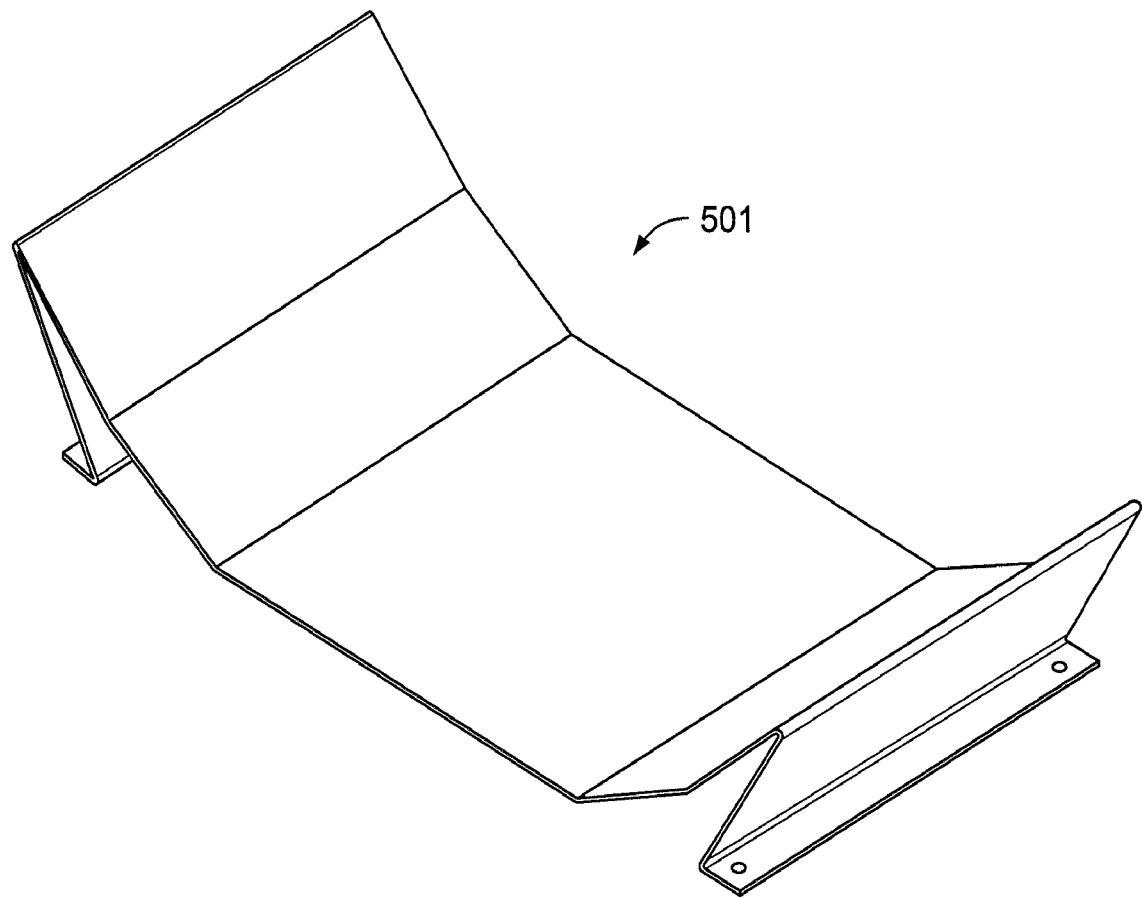
FIGS. 5A-5C show views of an exemplary outer base assembly hardware section 501 according to the teachings of the present invention.
Figure 5B:
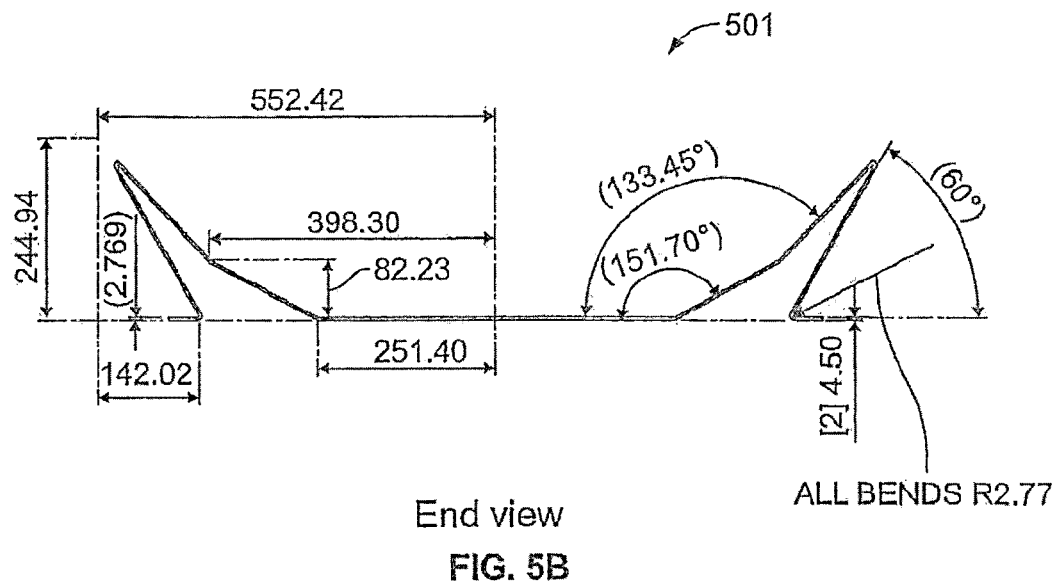
Figure 5C:
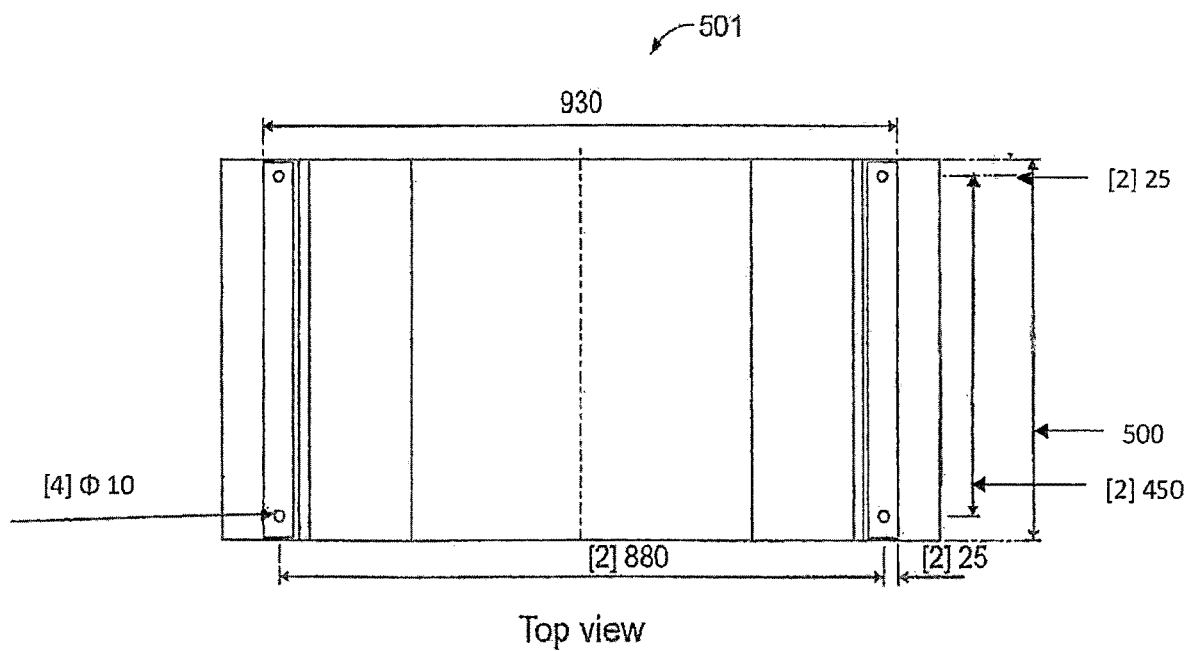
Figure 6A:
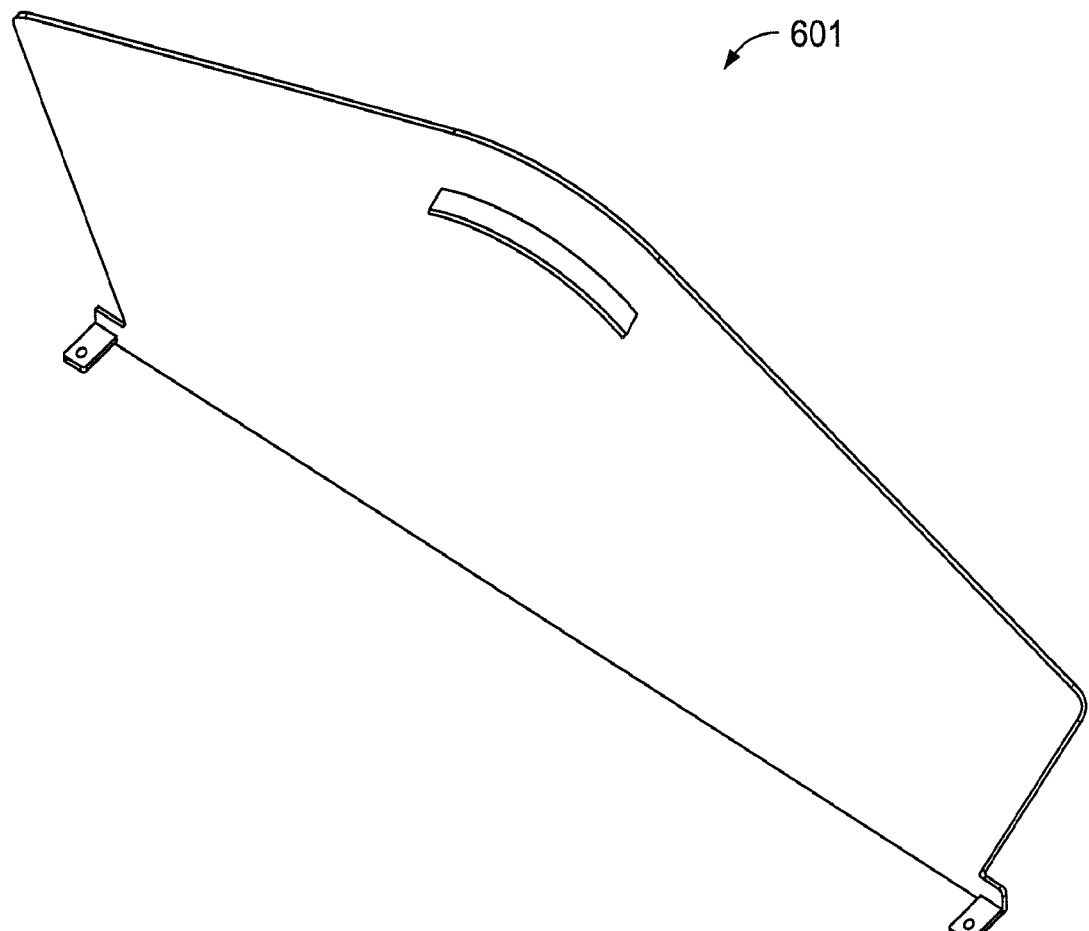
FIGS. 6A-6C show an end member 601 of a cell of the invention.
Figure 6B:
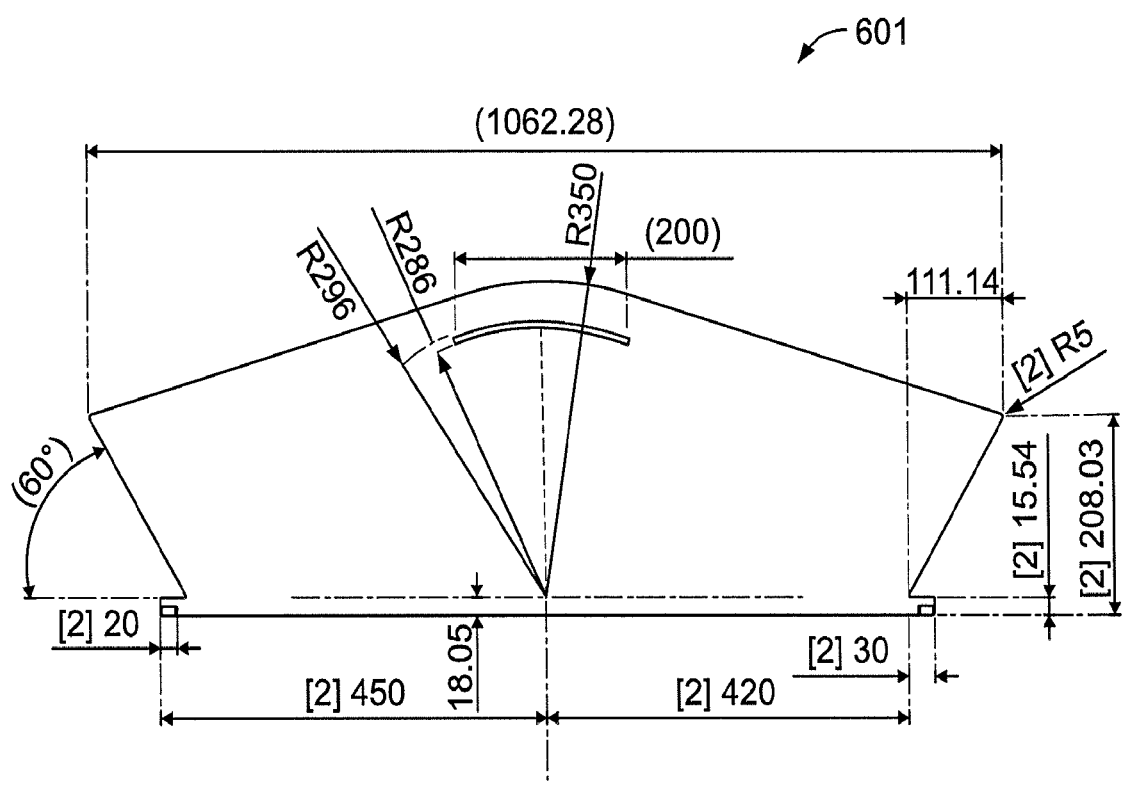
Figure 6C:
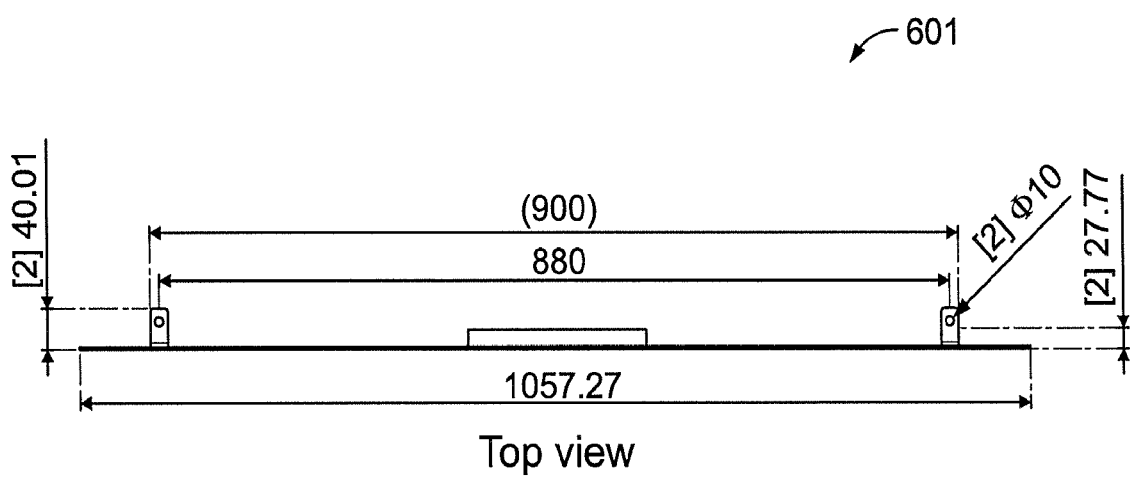

FIG. 3 shows an end member 301 of the cell 101. End member 301 includes hardware section 401 abutting end member 601 and supported by base section 501. FIG. 4A gives a perspective view of the hardware section 401. FIG. 4B gives an end view of the hardware section 401. FIG. 4C gives a top view of the hardware section 401. FIG. 5A gives a perspective view of the base section 501. FIG. 5B gives an end view of the base section 501. FIG. 5C gives a top view of the base section 501. FIG. 6A gives a perspective view of the end member 601. FIG. 6B gives an end view of the end member 601. FIG. 6C gives a top view of the end member 601.

Figure 7:
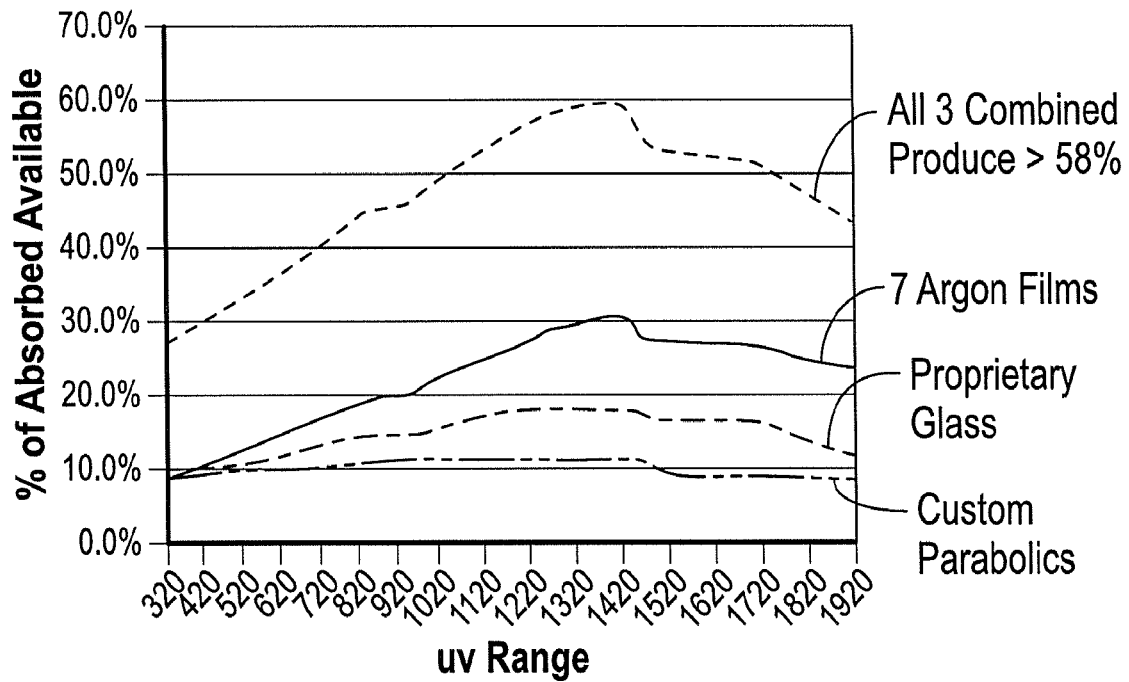
FIG. 7 shows a graphic depiction of efficiency of the present invention.

FIG. 7 shows efficiency of an EM-CS capture module such as cell 101. A capture module of the invention includes a capture cell with a body having a lower surface and a curved upper surface, both extending from a one end to the other, where the curved upper surface may be contoured to provide a surface approximately normal to the rays of the sun as the sun travels across the sky, from sunrise to sunset. Geometries such as this may provide up to about a 66% increase in solar exposure over conventional, flat or box-type solar cells. Note that because the size of the enclosure is very small relative to the earth, the sun does not generally travel in a constant arc relative to the enclosure. In some embodiments, the glass housing can be configured to have a smaller radius of curvature on 2 sides as compared to across the top of the glass housing. In other words, the housing is configured to have a roughly flower shaped configuration.

This can be useful to provide the capture of direct light during times of sunrise and sunset when energy from the sun is impinging on the glass at low angles of inclination to the earth. In other embodiments, the glass housing is configured in a flower-petal like shape to present a normal surface to the sun's rays as the sun moves across the sky during the day.

Figure 8A:
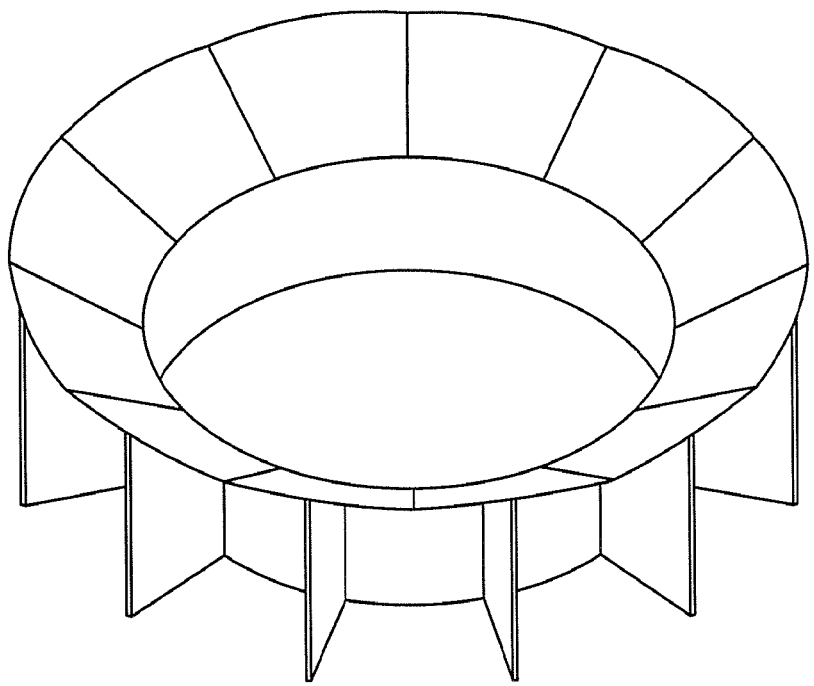
FIG. 8A gives a perspective view of the flower petal embodiment.
Figure 8B:
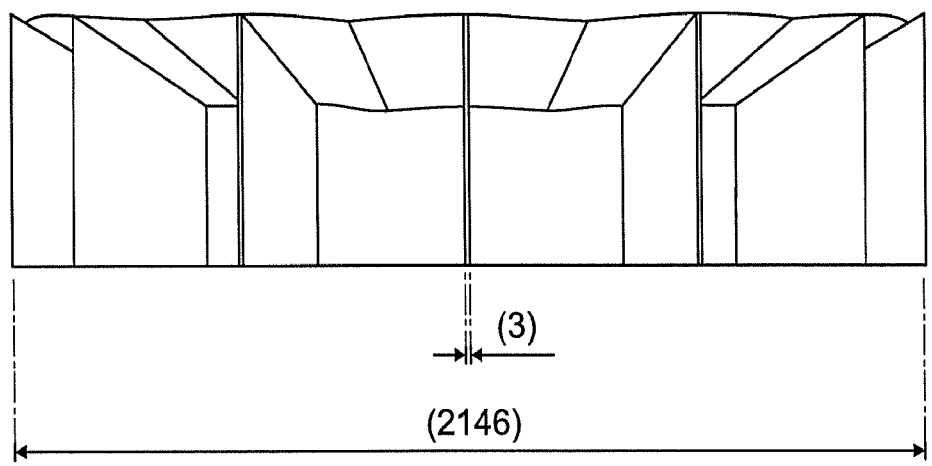
FIG. 8B gives a side view of the flower petal embodiment.
Figure 8C:
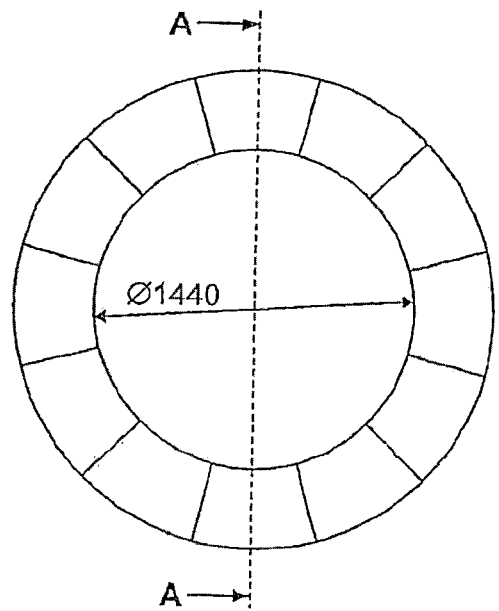
FIG. 8C gives a top view of the flower petal embodiment.
Figure 8D:
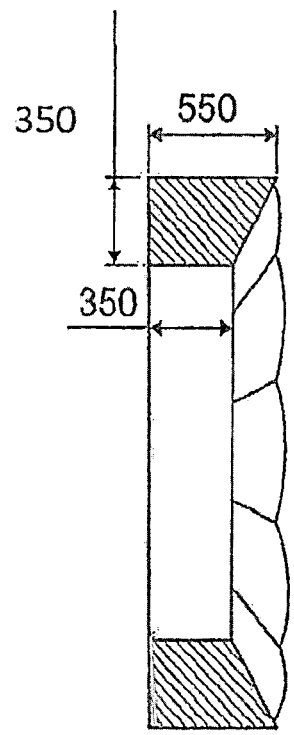
FIG. 8D is a sectional view along line AA in FIG. 8C.

FIGS. 8A-8D illustrate a complex shape for a "flower petal" member for use within a thick film/multi film cell according to certain embodiments. FIG. 8A gives a perspective view of the flower petal embodiment. FIG. 8B gives a side view of the flower petal embodiment. FIG. 8C gives a top view of the flower petal embodiment. FIG. 8D is a sectional view along line AA in FIG. 8C. The morphology depicted in FIG. 8A may be derived through the application of the algorithm illustrated by FIG. 9 to transform vectors of wide-spectrum incoming EM from multiple different times during a day into orientations for thick-film like layers produced by sputtering, selenization, annealing and lamination. One or multiple of the petal elements may be used in combination with each other or with other element disclosed herein with a broad spectrum EM-CS cell. In one embodiment, the invention provides an EM capture cell including at least one and preferably at least about 3 to 7 members as shown in FIG. 8 each member comprising a thick film defining at least about 1 to many bandgaps by included semiconductor materials as listed elsewhere herein.

Complex partially spherical shapes may but need not be used, and indeed, in various embodiments the enclosure can be shaped to present a more direct angle to the sun based on the sun's ephemeris for a given latitude and longitude or geographic region of application. Daylighting models and other techniques can be used to optimize the shape and contour of the glass enclosure to capture a maximum amount of energy.

Figure 9:
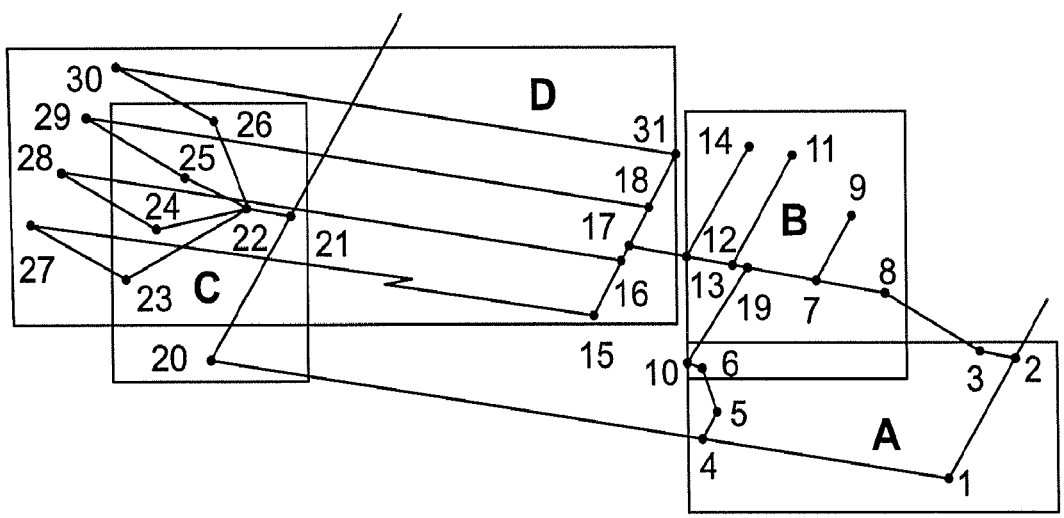
FIG. 9 is an algorithm showing how increased capture is driven in embodiments according to teachings of the present invention.

FIG. 9 shows a result of combining the Lens' makers equation and Snell's law to show that you can refract, focus and (not reflect away) 3.5 suns of energy into the EM-CS, with the outer layer schematically directing the light as shown by vectors illustrated in the bottom panel.

FIG. 9 illustrates the use of a transformation formula to guide the design of surface geometries with a cell of the invention. Where (X, Y, Z) are the coordinates of a 3D point in the world coordinate space, (u, v) are the coordinates of the projection point in pixels. A is called a matrix of intrinsic parameters. (cx, cy) is a principal point (that is usually at the image center), and fx, fy are the focal lengths expressed in pixel-related units. Thus, if an image from within the unit is scaled by some factor, all of these parameters should be scaled (multiplied/divided, respectively) by the same factor. The matrix of intrinsic parameters does not depend on the incoming light and, once estimated, can be re-used (as long as the focal length is fixed). The joint rotation-translation matrix [R|t] is called a matrix of extrinsic parameters. It is used to describe the motion of light source relative to cell. That is, [R|t] translates coordinates of a point (X, Y, Z) to some coordinate system, fixed with respect to the cell. Surface of the cell may have some distortion, mostly radial distortion and slight tangential distortion. So, the above model is extends as shown in FIG. 9. In FIG. 9, $k\_1$, $k\_2$, $k\_3$, $k\_4$, $k\_5$, $k\_6$ are radial distortion coefficients, $p\_1$, $p\_2$ are tangential distortion coefficients. Higher-order coefficients are not considered. In the functions shown the coefficients are passed or returned as ($k\_1$, $k\_2$, $p\_1$, $p\_2$[, $k\_3$[, $k\_4$, $k\_5$, $k\_6$]]) vector. That is, if the vector contains 4 elements, it means that $k\_3=0$. The distortion coefficients do not depend on the outside light, thus they also belong to the intrinsic cell parameters. The extended model shown in FIG. 9 can be used to project 3D points to the image plane given intrinsic and extrinsic parameters; compute extrinsic parameters given intrinsic parameters, a few 3D points and their projections; estimate intrinsic and extrinsic cell optic parameters from several views of a known calibration pattern (i.e. for design of the cell surface morphology); and estimate the relative position and orientation of the thick films and compute the rectification transformation that optimizes EM capture.

The capture cell may further comprise internal mirroring or silvering or other reflective coating on the bottom surface and at least a portion of the upper surface, for instance along the sides of the upper surface. In various example embodiments, the entire bottom surface may comprise a reflective coating or mirroring, as well as approximately two-thirds of the surface of the sides. The internal mirroring produces a photonic (ionic or electron) reflecting chamber, where electromagnetic radiation entering the capture cell reflects off the mirroring and bounces around inside the capture cell, creating a total internal reflection, or near total internal reflection, or a large number of reflections to contain photons that have entered the system. This has the effect of raising the likelihood that capture photons will impact the photovoltaic material distributed inside the capture cell.

Since mirroring in this example is confined to the bottom surface and a bottom portions of the side surface of the enclosure, it does not affect the external light penetration, diffraction, refraction or reflection; its only effect is "capturing" of photons once penetrated into the cell. When a photon is remains un-captured, it ultimately converts to heat, and heats the photovoltaic material. This increases the flow of electrons gathered from the photons (sometimes called the Delta-K effect by increasing the particle range).

The capture cell may have an optically active and non-reflective exterior (e.g., using a specific formulation of soda-lime, borosilicate or phosphate glass combination) allowing for a high level of photon penetration while minimizing diffraction, refraction or reflection that may occur from the angle of penetration or/of the Earth's/Sun solar curvature. This design allows for the attenuation of solar radiation from atmospheric scattering and increases the absorption of solar radiation available at a given location. Current photovoltaic systems typically use thin film photovoltaic cells, which have a very low efficiency, utilize only a fraction of the total available photons, and suffer from delaminating. Various embodiments of the technology described herein utilize thick film-like technology for the photovoltaic materials in some embodiments, these thick films can be as thin as 0.03 nm or as thick as 5.0 microns.

Moreover, as discussed the semantics of thin or thick films are such that artisans understand which versions can be implemented to allow the application of multiple layers or multiple bandgap material in one or more passes as needed, as explained herein. For example, transparent Kapton/molybdenum (or other polyimides needed available from DuPont, Wilmington, Del., USA such as UPILEX). A translucent, multi-leveled, multi-band gapped material, preferably a thick-film like-material (or multiple thick film band gap lattice (MTFBG) such as films 205, 206, . . . ) may be provided as the photovoltaic material. In various embodiments, the material can be an integrated multi-junction photovoltaic cell with multiple p-n junctions made of different semiconductor materials each having a different bandgap. In other embodiments, the multi-bandgap material can be made from a plurality of individual thick films, each having a photovoltaic material with a designated bandgap. Ideally, the stack is made such that each p-n junction has a different bandgap energy, and produces current in response to a different wavelength of the electromagnetic spectrum impinging on the device. This increases the conversion efficiency of the device by using more of the available electromagnetic spectrum.

Providing multiple materials with multiple band gaps allows the unit to respond to multiple different wavelengths of the spectrum. In some embodiments, the photovoltaic stack includes 2 to 4 layers of bandgap materials each having a different bandgap energy. In other embodiments, other numbers of layers of bandgap materials can be provided, including a single layer stack or more than 4 layers. Marginal returns may diminish with increasing number of layers depending on a number of factors including, for example, the spectrum of available electromagnetic energy, the transparency and absorption efficiency of the various materials in the stack, the amount of internal reflection that can be achieved to contain capture photons, and so on. In operation, the outer bandgap material of the photovoltaic stack captures the photons it can at the wavelength associated with its bandgap energy and converts those into electric current.

Those photons not captured by the first layer, pass through to subsequent layers until they are captured, absorbed, reflected off the surface of a subsequent layer, or pass through the stack and are reflected off of the reflective surfaces of the glass enclosure, A portion of the reflected photons reach the photovoltaic stack again providing the opportunity for these otherwise lost photons to be captured and converted to electric current. The multi-leveled, multi-band gapped thick film can be bendable and may incorporate different materials having different band gaps optimized for different wavelengths of light present in white light (including for instance ultraviolet and infrared light), and for different wavelengths of light that occur at different times. For instance, during sunrise and sunset the spectrum of light is different from that of mid-day, so different materials may be provided with different band gaps to capture as much of the energy of those different types of light as possible. In one example embodiment the different materials may comprise GaAs, Ge, Si and GaInP2, for instance. In other embodiments materials such as GaS, GIP, GIA, InGa, CdTe, CIGS, CdTe/CdS, CuInSe2, GIN, ZMT, and/or CdS, may be used. In some embodiments, the band gaps of the materials are selected such that there are overlapping bands to achieve energy conversion from the most dense regions of the spectrum. In some embodiments, the chemical compositions of the materials can be varied to tune the bandgaps of the junctions.

Table 1 illustrates another example of different materials that can be used along with their associated band gaps and estimated conversion efficiencies using 2 or more layers. Artisans understand the exemplary numbers are lowered in this example due to overlap.

TABLE 1

| | | |
|---|---|---|
| InN (ZnS; ZnSe) | 3.6 eV | 8.00% |
| CIGS (CdS; InGaAs) | 2.4 eV | 19.01% |
| InGaAsP (GaP; InGaP) | 1.84 eV | 15.02% |
| CdTe (GaAs) | 1.44 eV | 16.06% |
| c-Si (GaAs; InGaAs) | 1.12 eV | 18.78% |
| InGaAs (a-Si:H; GaInP) | 0.92 eV | 9.05% |
| Ge (InAs; GaSb; InSb) | 0.70 eV | 6.02% |

In various example embodiments two, three, four or five layers of unique thick films 300 may be provided that can gather photons on either side of the film, each of which may in certain embodiments vary from about 0.03 to 5.0 microns in thickness (e.g., shown as films 205, 206, . . . in FIG. 2B). The length and width of the films can be of suitable dimensions depending on the available dimensions and volume of the enclosure. The length and width can also be chosen based on the manner in which the films are layered within the enclosure. For example, in some embodiments, the films can be layered in a planar or flat (or substantially flat) configuration within the enclosure. In other embodiments, the films can be curved or curled or wrapped, and layered within the enclosure in a coaxial or substantially coaxial fashion. For example, flexible layers can be used with sufficient resilience such that when inserted into the enclosure they conform to the inner contour of the enclosure. Accordingly, the films can be configured to take the shape of the enclosure. Where design issues have traditionally been seen to limit the width of the film, ribbon-like lengths of film can be wound (e.g. in a helical fashion) within one another inside the enclosure. The multiple-layer translucent photovoltaic stack may be electrically connected with a positive charge for ionic collection. The multiple-layer translucent photovoltaic stack may be at least partially surrounded by internal mirroring, as described above with respect to FIGS. 1, 2 and 3. This unique film technology allows bidirectional photovoltaic pathway (i.e., energy conversion from the top down and from the bottom up).

As noted above, in various embodiments the multiple layers of bandgap materials can be fabricated whether as an integrated device or as individual sheets, using thick film technology. In examples, polyamides, a thick film substrate such as Mylar, KAPTON, or any other polyimide film (available from DuPont, Wilmington, Del., USA), or other film can be used as a substrate, such materials are available in varying degrees of transparency. The substrate sheet can be run through a deposition device (e.g. using chemical vapor deposition or CVD) or other like device in which the layers of the device are deposited onto the substrate. In addition to chemical vapor deposition, other techniques such as, for example, Extrusion Positive Printing, VPD, Sputtering, and the like can be used to lay down the various layers.

For example, in such a process the electrode layers and semiconductor layers can be deposited onto the substrate to produce the thick film photovoltaic material. The fabrication device can be maintained with a positive pressure using an inert gas such as, for example, argon, to keep the chamber relatively free or completely free of oxygen. This can avoid the detrimental effects of oxidation on the materials. Where bandgap materials are fabricated on individual sheets, a single junction device can be fabricated on a given substrate.

On the other hand, wherein hetero junction device is desired, multiple bandgap materials can be deposited onto a single substrate. Where desired, indium tin oxide, graphing, or other like materials can be used to create transparent electrodes. The various aspects of the disclosed technology may be used individually or in various combinations, including in complete energy conversion systems comprising: a capture cell (in which photons may be more completely retained giving rise to a greater degree of energy absorption and conversion); a multi-layered photovoltaic system, a unique thick-film processing technology; the utilization of multigap material for greater access to the light spectrum (hence greater exposure and greater absorption of photons); and with a multi-dimensional core for use with nanotechnology is being (dots, lattice) GPS and various sensor, storage usages and ozone creation. In addition, the ability to capture indirect lighting from the angle and type of glass formulations increases the total overall energy wattage of the system. The use of capture cells with multiple levels of collecting film 300 may incorporate all of the above technologies to create a multi-layered, multi-band gap, bidirectional photovoltaic film core. The capture cell can work with the thick film by increasing the amount of light exposure that can provide photonic absorption, and by increasing the number of photon passes through the band gap material.

The thick film avoids problems in thin film technology; it is more stable and still allows for transparency for photons to pass through multiple absorption layers with multiple band gap materials. The present photovoltaic system can be used to generate a flow of electrons (an electric current) where there is sunlight or another source of electromagnetic radiation or waves. The present photovoltaic system can be used on or in homes, commercial buildings, industrial applications, automobiles, or any other form of transportation. The system can be portable, as it is highly efficient and can be used anywhere that energy is needed. The band gap of a material is the energy required to excite an atom of that material sufficiently to move one of its electrons from a lower energy state, or band, to a higher energy state, or band.

Only photons with energy levels greater than that of the band gap can excite electrons to move from the valence band to the conduction band, where they can flow and create electricity. For materials with lower band gaps, a greater range of light frequencies will have sufficiently high energies to excite electrons in those materials to move from the valence band to the conduction band (this helps determine Valence band material). Moreover, there are various "tunable" materials, such as InGap or CIGS. Therefore, the smaller the band gap of a material, the more easily light striking that material may be converted to electricity. But when the band gap is too small, the negatively-charged electrons in the conduction band recombine too easily with the positively-charged atoms they left behind (i.e., "holes"), such that maintaining a flow of electrons (i.e., an electrical current) becomes difficult.

Because different frequencies of light carry different levels of energy, materials with different band gaps may be provided to capture the different frequencies of light within a spectrum to optimize the total amount of energy obtainable from the spectrum. Band gaps are selected that are not only efficient at a certain wavelength, but also that gather the most total electrons, keeping in mind that higher frequency light carries more energy. Some examples of band gaps are: Silicon's band gap is 1.11-1.12 eV; Selenium's is 1.5-1.6 eV; GaAs Gallium/Arsenic's is 1.3-1.4 eV; CuO cupric/Oxide's is 2.0 eV; GaTe is 1.4 eV; AlAs Aluminum/Arsenic's is 2.3 eV. Light also has specific unique wavelengths.

For example, Red is 622-780 nm; Orange is 622-597 nm; Infrared A is 700-1400 nm; Infrared B is 1400-3000 nm; and Infrared C is 3000-10000 nm. Accordingly, Silicon could theoretically convert 100% of the photons having a wavelength equivalent to its 1.11-1.12 eV band gap, while also converting a lower percentage of photons having a shorter wavelength and higher energy. However, photons of light having a wavelength over 1.12 eV will not generate any electricity in Silicon, because these longer wavelength photons have less than the minimum level of energy needed to overcome Silicon's 1.11-1.12 eV band gap.

In practice, conventional solar cells using Silicon have had actual conversion efficiencies ranging from about 12% to 14%. That is, only about 12% to about 14% of the energy in the photons hitting conventional Silicon solar cells is converted to electricity (the same range as Hoffman produced in 1960 or 54 years ago). The use of tunable PV material, i.e., InGS(N)(P), CIGS, GaAs, AlGeN, changes this. By pushing the formula higher in the Se one can manipulate both the band gap and adjust for the "holes." Hence, if using Si provides a range of at least about 1,112-800 ev (with the latter giving way to more holes) then one can tune the other separate layers to cover 850-600 and 650-315, thus, covering the highest gradient of energy (from IRc-UVb).

True efficiency considers the range of energy covered; efficiency of said range converted; and duration of energy focused. What plays into this is angle internal mirroring (capturing) reduced reflection/refraction. Prototypes were tested using combinations of Indium, Gallium and nitrogen (Inl-xGaxN), which together convert virtually the entire spectrum of sunlight, including ultraviolet, infrared and some limited portion of the x-ray spectrum. These materials were doped with Cadmium telluride (CdTe) and Copper Indium gallium selenide (CIGS), CdTe/CdS, CuInSe2 (copper indium selenide-CIS), Gallium Indium Nitride (GIN); Zinc Manganese Telluride (ZMT); Cadmium sulfide (CdS).

Figure 10:
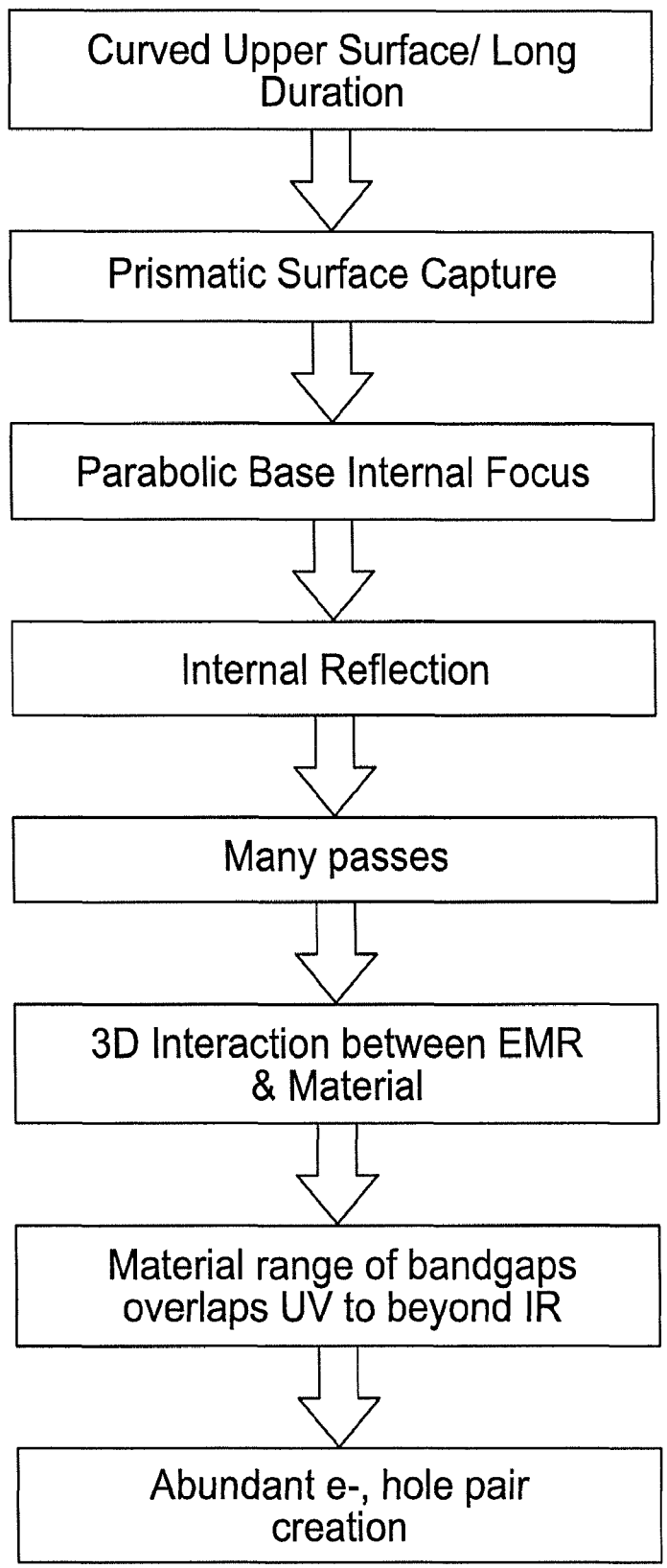
FIG. 10 is schematic flow chart of steps according to the process for optimizing harvest of energy from the electromagnetic spectrum.

FIG. 10 diagrams methods of the invention. The flow chart of steps shows a process for optimizing harvest of energy from the electromagnetic spectrum.

Figure 11:
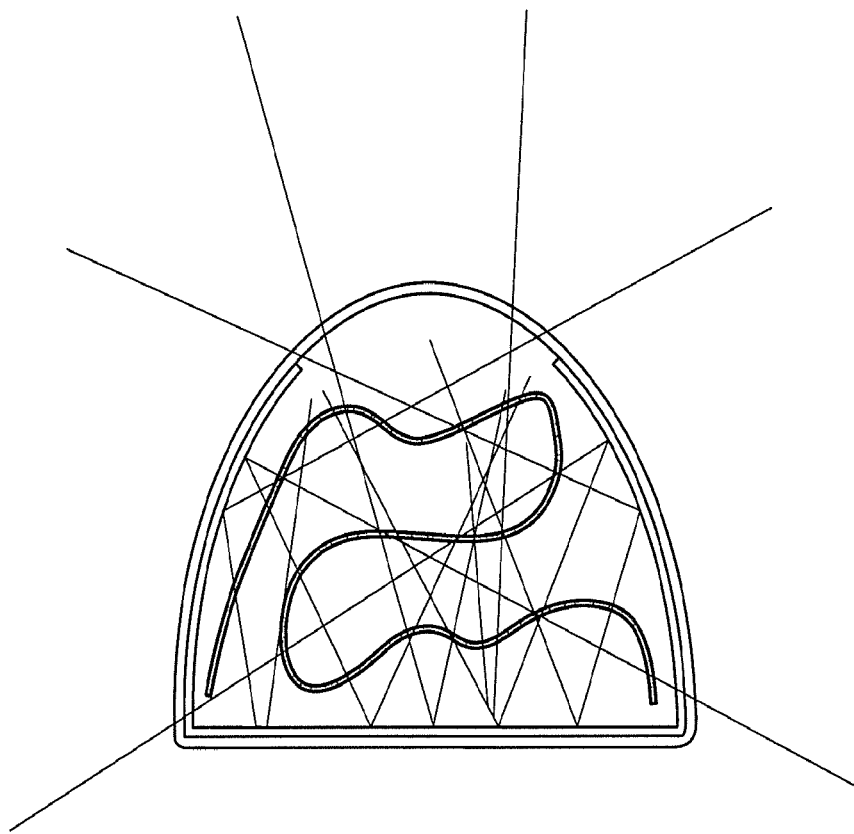
FIG. 11 illustrates schematically the recirculation of internal EMR for multiple passes through material of a cell, as demonstrated by the instant teachings.

FIG. 11 illustrates the recirculation of internal EMR for multiple passes through material of a cell, likewise photons sourced from direct, indirect, reflected, prismatic and diffused energy are housed and energy derived from same, according to the instant EM-CS.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Any schematics and/or flow chart diagrams along with verbal descriptions of steps, included herein are generally set forth as either linguistic or pictorial logical flow chart diagrams. As such, the depicted order and labeled steps are indicative of one embodiment of the presented method. Other steps and methods may be conceived that are equivalent in function, logic, or effect to one or more steps, or portions thereof, of the illustrated systems, processes or methods.

Additionally, any format and/or symbols employed are provided to explain the logical steps of associated systems, processes and methods and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a step is suggested does not indicate that it needs to be performed prior to or after another step unless expressly set forth.

Expressly incorporated by reference, as if fully set forth herein are the following United States Letters Patents and publications, and foreign patents—each of which has been reviewed and distinguished from the instant teachings. They are offered herein merely to define the state of the art, and being contemporaneously filed as an information disclosure statement. U.S. Pat. Nos. 8,093,492; 6,335,480; and 6,898,949

Legacy or historical attempts to address these issues also have some value, in defining the state of the art, and paucity of improved applications to overcome the science.

While methods, devices, compositions, and the like, have been described in terms of what are presently considered to be the most practical and preferred implementations, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure includes any and all implementations of the following claims. It is understood that the term, present disclosure, in the context of a description of a component, characteristic, or step, of one particular embodiment of the disclosure, does not imply or mean that all embodiments of the disclosure comprise that particular component, characteristic, or step.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that as the disclosure relates to elements of the disclosure, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference.

To the extent that insubstantial substitutes are made, to the extent that the applicant did not in fact draft any claim so as to literally encompass any particular implementation, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative implementations.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive forms so as to afford the applicant the broadest coverage legally permissible.

What is claimed is:

1. An electromagnetic energy capturing system (EM-CS), which comprises a cell that includes, in combination:

At least a body of material with a curved upper surface layer and a lower surface layer, with a reduction of reflection of EMR, whereby the curved upper surface layer receives electromagnetic radiation (EMR) into the EM-CS;

wherein the curved upper surface layer increases the transmission of EMR, as opposed to a flat surface layer, and the space between the curved upper surface layer and lower surface layer containing a plurality of photovoltaic films, and wherein the curved upper and lower surface layers reflect internal EMR back into the plurality of photovoltaic films below the curved upper surface layer of the body; and the plurality of photovoltaic films comprising multiple layer films comprising a plurality of semiconductors, and wherein the multiple layer films assume a non-planar three-dimensional ribbon geometry, wound within one another, such that they substantially span three dimensions of space between the curved upper surface layer and lower surface layer, whereby the internal EMR interacts with the material in three dimensions and;

whereby the internal EMR excites electrons form a valance band to a conduction band in the material; and at least one electrode is in contact with the cell to provide electrical energy.

2. The system of claim 1, wherein the curved upper surface layer of the body defines the upper limit of a body of material containing a plurality of photovoltaic films which are comprised of multiple ribbons of films comprising a plurality of semiconductors.

3. The system of claim 2, wherein the films are a product formed within an Argon gas environment such that the plurality of photovoltaic films will resist delamination at manufacture.

4. The system of claim 1, further comprising a first electrode and a second electrode which are in contact with material thereby forming a first electrical contact and a second electrical contact.

5. The system of claim 4, wherein the curved upper surface layer of the body of material is shaped such that when the cell sits outdoors on a cloudless day, direct sunlight defines a normal to the curved surface from sunup to sundown.

6. The system of claim 5, wherein exposure of the curved upper surface layer to broad spectrum EMR produces a voltage across the plurality of photovoltaic films by way of the first electrical contact and the second electrical contact.

7. The system of claim 1, wherein the EM-CS captures energy from EMR across a spectrum of 200-5000 nm.

8. The system of claim 1, wherein exposure of the curved upper surface layer to EMR produces at least 2 kW per $m^3$ in the system.

9. The system of claim 1, which is operable to use the UV, visible, and invisible EMR to produce power, the curved upper surface layer of the body of the cell further comprised of glass-material including tempered phosphate, and sapphire glass, and further comprising an angled silvered-apical prism to absorb indirect EMR.

10. The system of claim 1 comprising films manufactured in an Argon environment as the plurality of photovoltaic films comprising multiple ribbons of films internally disposed within the body.

11. The system of claim 10, wherein the photovoltaic films are transparent, stable, and are able to absorb between 200 nm and 5000 nm of EMR spectrum.

12. The system of claim 1, operable to absorb the total EMR spectrum with less than 6-8% of EMR refracted.

13. The system of claim 1, further comprising double parabolic reflecting bases.

14. The system of claim 1, further comprising an internal lining that breaks up the EMR and increases absorption by acting as a semi-permeable membrane allowing radiation in but inhibiting its exit.

15. The system of claim 1, wherein prismatic focusing of EMR into the plurality of photovoltaic films comprising multiple ribbons of films internally disposed beneath the curved upper surface layer of the body and the lower surface layer.

16. The system of claim 1, having a parabolic mirror surface under the plurality of photovoltaic films comprising multiple ribbons of films that forces EMR back through the plurality collection of photovoltaic film material comprising multiple ribbons of films such that photons of EMR, on average, pass through the material at least about 7 times, and at least some of the photons of EMR, pass through the material approximately 37 times.

* * * * *